(12) United States Patent
Deng et al.

(10) Patent No.: US 12,307,589 B2
(45) Date of Patent: May 20, 2025

(54) GENERATING SEMANTICALLY-LABELLED THREE-DIMENSIONAL MODELS

(71) Applicant: QUALCOMM Incorporated, San Diego, CA (US)

(72) Inventors: Yan Deng, La Jolla, CA (US); Ze Zhang, San Diego, CA (US); Michel Adib Sarkis, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 18/187,595

(22) Filed: Mar. 21, 2023

(65) Prior Publication Data
US 2024/0320909 A1 Sep. 26, 2024

(51) Int. Cl.
*G06T 17/00* (2006.01)
*G06T 7/10* (2017.01)
*G06T 19/00* (2011.01)

(52) U.S. Cl.
CPC ............... *G06T 17/00* (2013.01); *G06T 7/10* (2017.01); *G06T 19/003* (2013.01);
(Continued)

(58) Field of Classification Search
CPC ......... G06T 17/00; G06T 7/10; G06T 19/003; G06T 2207/20081; G06T 2207/20084;
(Continued)

(56) References Cited

U.S. PATENT DOCUMENTS 11,205,298 B2 * 12/2021 Ondruska ............... G06T 15/08
11,244,504 B2 * 2/2022 Chen .................... G06T 17/205
(Continued)

FOREIGN PATENT DOCUMENTS

CN 115482367 A * 12/2022
WO WO-2024073214 A1 * 4/2024 ............... G06N 3/00

OTHER PUBLICATIONS

Cheng B., et al., "Masked-Attention Mask Transformer for Universal Image Segmentation", Proceedings of the IEEE/CVF Conference on Computer Vision and Pattern Recognition, Arxiv.Org, Cornell University Library, 201 Olin Library Cornell University Ithaca, NY 14853, arXiv:2112.01527v3 [cs.CV], Jun. 15, 2022, XP091247403, pp. 1-20.
(Continued)

*Primary Examiner* — Jeffery A Brier
(74) *Attorney, Agent, or Firm* — Polsinelli/Qualcomm

(57) ABSTRACT

Systems and techniques are described herein for generating one or more three-dimensional models. For instance, a method for generating one or more three-dimensional models is provided. The method may include obtaining a plurality of images of an object; obtaining a plurality of segmentation masks associated with the plurality of images, each segmentation mask of the plurality of segmentation masks including at least one label indicative of at least one segment of the object in a respective image of the plurality of images; training, using the plurality of images and the plurality of segmentation masks, a machine-learning model to generate one or more semantically-labeled three-dimensional models of the object; and generating using the trained machine-learning model, a semantically-labeled three-dimensional model of the object, the semantically-labeled three-dimensional model of the object including at least one label indicative of the at least one segment of the object.

30 Claims, 9 Drawing Sheets

(52) U.S. Cl.
CPC ............... *G06T 2207/20081* (2013.01); *G06T 2207/20084* (2013.01); *G06T 2219/004* (2013.01)

(58) Field of Classification Search
CPC ............ G06T 2219/004; G06V 10/26; G06V 10/774; G06V 10/82; G06V 20/64; G06V 20/647
See application file for complete search history.

(56) References Cited

U.S. PATENT DOCUMENTS

| | | | | |
|---|---|---|---|---|
| 11,410,376 | B2* | 8/2022 | Murez | ...................... G06T 15/08 |
| 2020/0349763 | A1* | 11/2020 | Chen | .......................... G06T 7/73 |
| 2020/0357191 | A1* | 11/2020 | Khaloo | ................. G06T 7/0004 |
| 2020/0364930 | A1* | 11/2020 | Buys | ........................ G06T 17/05 |

OTHER PUBLICATIONS

International Search Report and Written Opinion—PCT/US2024/015254—ISA/EPO—Nov. 4, 2024.

Liu Z., et al., "Unsupervised Continual Semantic Adaptation Through Neural Rendering", Arxiv.Org, Cornell University Library, 201 Olin Library Cornell University Ithaca, NY 14853, Nov. 25, 2022, XP091378411, pp. 1-18, Fig 1,2,3, abstract, Sec 1, Para. 3 to last, Sec. 2, subsection "NeRF-based semantic learning", Sec. 3.1, Para. 1, Sec. 3.2, Para. 1 and 2, Sec. 3.2, subsection "NeRF-based pseudo-labels", Supplementary material, Sec. A, subsection NeRFH, Para. 1 and 2, Supplementary material, Sec. B.1, Para. 1, Supplementary material, Sec. B.2, last Para.

Siddiqui Y., et al., "Panoptic Lifting for 3D Scene Understanding with Neural Fields", Arxiv.Org, Cornell University Library, 201 Olin Library Cornell University Ithaca, NY 14853, Dec. 19, 2022, XP091398520, pp. 1-13, abstract, Fig. 1,2,3,6,7, Sec. 1, Para. 4, p. 2, left-hand column, Sec. 2, subsection "2D and 3D panoptic segmentation", Sec. 3, introductory portion, Sec. 3.1, Sec. 3.2, subsection "Panoptic radiance field", Sec. 3.3, subsections "appearance loss", "semantic loss", and "training objective", Sec. 4 "experiments", subsection "data", Sec. 4.1, Para. 1, Sec. 4.1.3.

Vora S., et al., "NeSF: Neural Semantic Fields for Generalizable Semantic Segmentation of 3D Scenes", Arxiv.Org, Cornell University Library, 201 Olin Library Cornell University Ithaca, NY 14853, Dec. 3, 2021, XP091109858, pp. 1-23, abstract, Fig. 1,2,3,5,7, Sec. 1, Para. 6, p. 2, left-hand column, Sec. 3, introductory portion, Sec. 3.1 and 3.2, Sec. 4, subsection "Train/Test splits", Sec. 5.2, subsection "Sensitivity to reconstruction quality", table 5, Sec. 6, Para. 1, Supplementary material—Sec. C.1, Para. 2, Supplementary material—Sec. C3 "Multiview consistency".

Zhi S., et al., "In-Place Scene Labelling and Understanding with Implicit Scene Representation", Arxiv.Org, Cornell University Library, 201 Olin Library Cornell University Ithaca, NY 14853, arXiv:2103.15875v2 [cs.CV], Aug. 21, 2021, XP091023971, 14 pages, The Whole Document.

* cited by examiner

… (1) …

GENERATING SEMANTICALLY-LABELLED THREE-DIMENSIONAL MODELS

TECHNICAL FIELD

The present disclosure generally relates to generating three-dimensional models. In some examples, aspects of the present disclosure are related to generating semantically-labelled three-dimensional models.

BACKGROUND

Semantic labeling, or semantic segmentation, involves assigning labels to pixels of images. There are techniques to semantically segment a two-dimensional image (e.g., a red, green, blue (RGB) image) to assign semantic labels to pixels of the image. The semantic labels can be used for various applications, such as extended reality (XR) applications, autonomous or semi-autonomous driving applications, navigation applications for robotic devices (e.g., an autonomous vacuum cleaning system), among others. There is a need for providing consistent multi-view label information instead of only single image-based segmentation.

SUMMARY

Systems and techniques are described for generating one or more three-dimensional models. According to at least one example, a method is provided for generating one or more three-dimensional models. The method includes: obtaining a plurality of images of an object; obtaining a plurality of segmentation masks associated with the plurality of images, each segmentation mask of the plurality of segmentation masks including at least one label indicative of at least one segment of the object in a respective image of the plurality of images; training, using the plurality of images and the plurality of segmentation masks, a machine-learning model to generate one or more semantically-labeled three-dimensional models of the object; and generating using the trained machine-learning model, a semantically-labeled three-dimensional model of the object, the semantically-labeled three-dimensional model of the object including at least one label indicative of the at least one segment of the object.

In another example, an apparatus for generating one or more three-dimensional models is provided that includes at least one memory and at least one processor (e.g., configured in circuitry) coupled to the at least one memory. The at least one processor configured to: obtain a plurality of images of an object; obtain a plurality of segmentation masks associated with the plurality of images, each segmentation mask of the plurality of segmentation masks including at least one label indicative of at least one segment of the object in a respective image of the plurality of images; train, using the plurality of images and the plurality of segmentation masks, a machine-learning model to generate one or more semantically-labeled three-dimensional models of the object; and generate using the trained machine-learning model, a semantically-labeled three-dimensional model of the object, the semantically-labeled three-dimensional model of the object including at least one label indicative of the at least one segment of the object.

In another example, a non-transitory computer-readable medium is provided that has stored thereon instructions that, when executed by one or more processors, cause the one or more processors to: obtain a plurality of images of an object; obtain a plurality of segmentation masks associated with the plurality of images, each segmentation mask of the plurality of segmentation masks including at least one label indicative of at least one segment of the object in a respective image of the plurality of images; train, using the plurality of images and the plurality of segmentation masks, a machine-learning model to generate one or more semantically-labeled three-dimensional models of the object; and generate using the trained machine-learning model, a semantically-labeled three-dimensional model of the object, the semantically-labeled three-dimensional model of the object including at least one label indicative of the at least one segment of the object.

In another example, an apparatus for generating one or more three-dimensional models is provided. The apparatus includes: one or more means for obtaining a plurality of images of an object; one or more means for obtaining a plurality of segmentation masks associated with the plurality of images, each segmentation mask of the plurality of segmentation masks including at least one label indicative of at least one segment of the object in a respective image of the plurality of images; one or more means for training, using the plurality of images and the plurality of segmentation masks, a machine-learning model to generate one or more semantically-labeled three-dimensional models of the object; and one or more means for generating using the trained machine-learning model, a semantically-labeled three-dimensional model of the object, the semantically-labeled three-dimensional model of the object including at least one label indicative of the at least one segment of the object.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
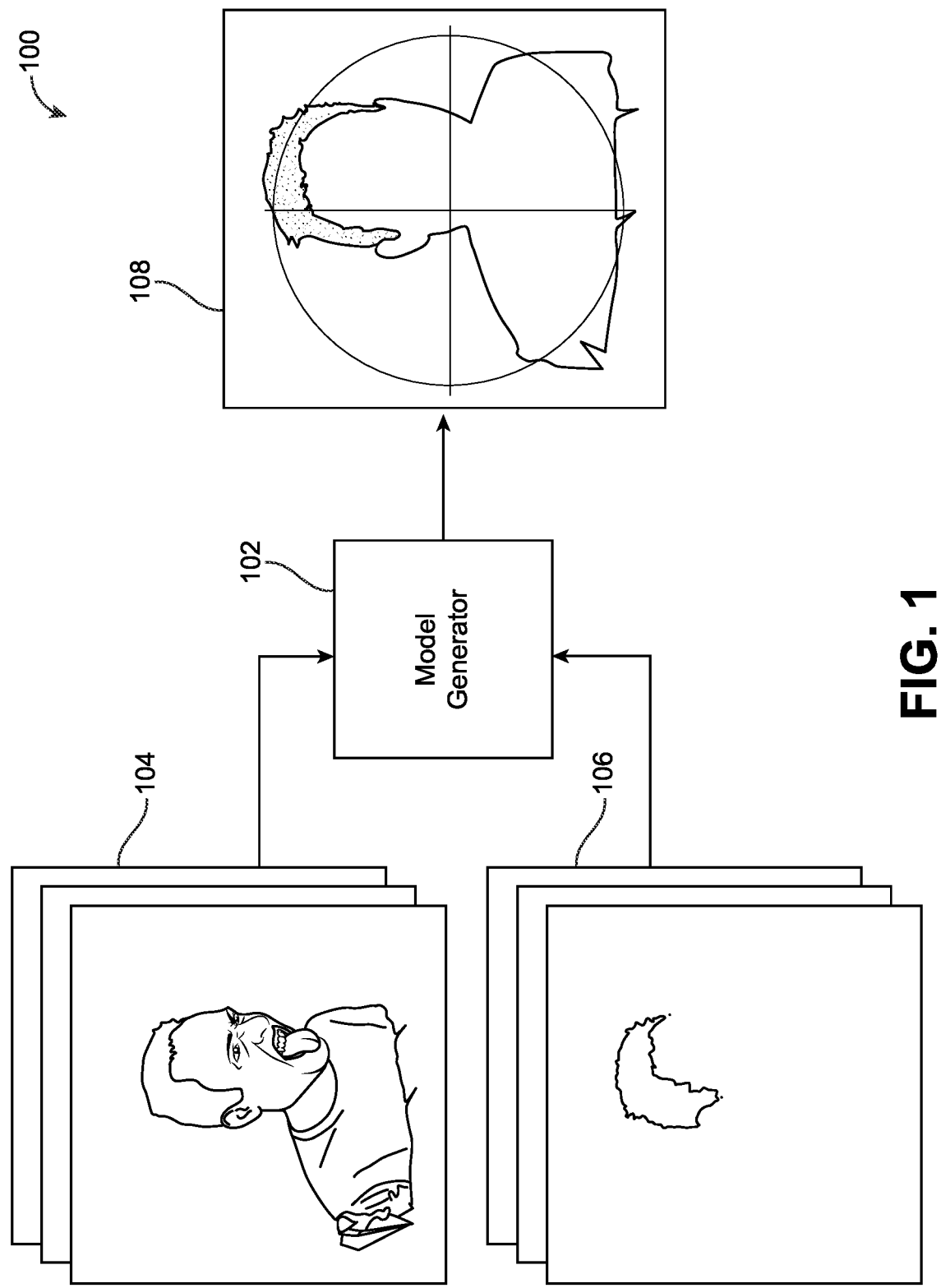
FIG. 1 is a block diagram illustrating a system for generating a semantically-labelled three-dimensional model, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

For a variety of applications (e.g., extended reality (XR) applications including virtual reality (VR), augmented reality (AR), and/or mixed reality (MR) applications, autonomous driving applications, navigation applications for robotics systems, etc.), it may be desirable to generate semantically-labelled three-dimensional models of objects. For instance, it may be desirable to have multi-view consistent label information for a three-dimensional model of an object rather than having segmentation information based on only a single view of the object (e.g., generated using a conventional two-dimensional-image segmentation technique). As an example, with a semantically-labelled three-dimensional model of a person, it may be possible to alter attributes (e.g., semantically-labelled attributes) of the model based on the labeled segments of the model.

There are techniques for generating new two-dimensional images of an object based on a number of existing two-dimensional images of the object. These techniques may be referred to herein generally as "multi-view reconstruction" techniques. Some multi-view reconstruction techniques include training a machine-learning model (e.g., a "multi-view reconstruction network") using existing two-dimensional images of an object, and inferring new two-dimensional images using the trained machine-learning model. Such a machine-learning model may generate a representation of the object. Such techniques may render the representation as two-dimensional images. One example technique can use a neural radiance field (NeRF) and/or an implicit differentiable renderer (IDR).

Multi-view reconstruction techniques may be trained using color images (e.g., red, green, blue (RGB) images or images having luminance (Y) and chrominance (C) components) and may infer color images. For example, a radiance-field-based reconstruction algorithm may be trained using a number of RGB images and may infer RGB images based on an occupancy field and color density.

The present disclosure describes systems, apparatuses, methods (also referred to herein as processes), and computer-readable media (collectively referred to as "systems and techniques") for generating semantically-labelled three-dimensional models. According to some aspects, the systems and techniques can train a multi-view reconstruction network using RGB images and label data such that the multi-view reconstruction network generates an implicit neural representation including RGB and label information. In some cases, the systems and techniques can extract the implicit neural representation to generate an explicit semantically-labelled three-dimensional model including color and label information. For instance, the systems and techniques can generate a three-dimensional model of an object, where each vertex (or voxel) of the model is associated with a color and a label.

In one illustrative example, systems and techniques may obtain a number of two-dimensional images (e.g., RGB images, monochrome or grayscale images, etc.) of an object. The systems and techniques may further obtain a number of segmentation masks. Each of the segmentation masks is associated with one of the two-dimensional images of the object. Each of the segmentation masks may include at least one label indicative of at least one segment of the object. For example, a segmentation mask may include a value corresponding to each pixel of an image that is associated with the segmentation mask. Each value of the segmentation mask may indicate a label of the corresponding pixel of the associated image. For example, the systems and techniques may obtain an image of a person's head Using a trained machine-learning model, the systems and techniques may segment the image to generate a segmentation mask. The segmentation mask may include a value for each pixel in the image. The values of the segmentation mask may indicate which pixels of the image are labeled as "hair," "eyes," "nose," etc.

The systems and techniques may train a machine-learning model (e.g., a multi-view reconstruction network) using the two-dimensional images of the object and the segmentation masks. The machine-learning model may be trained to receive, as an input, a location and to provide, as an output, a simulated image of the object as captured from the location. Further, because the machine-learning model was trained using the segmentation mask, the machine-learning model may be trained to output information indicative of labels of segments of the simulated image.

After training the machine-learning model, the systems and techniques may make explicit an implicit neural representation of the model of the object stored in weights of the machine-learning model. For example, the systems and techniques may sample the implicit neural representation of the model of the object by causing the machine-learning model to infer color and label at a number of locations. The systems and techniques may sample points the implicit neural representation of the model of the object at points of a simulated three-dimensional space (e.g., voxels) and may generate an explicit point-cloud model of the object based on the sampling. The explicit point-cloud model may include color and label information.

Various aspects of the systems and techniques are described herein and will be discussed below with respect to the figures.

FIG. 1 is a block diagram illustrating a system 100 for generating a semantically-labelled three-dimensional model (model 108), according to various aspects of the present disclosure. System 100 includes model generator 102, which may generate model 108 based on images 104 and segmentation masks 106.

Images 104 may include multiple RGB images 104 of an object (e.g., a head) captured from different locations (e.g., different viewing angles). Images 104 may include, as metadata, information regarding the locations from which the images were captured. Alternatively, model generator 102 may estimate the locations from which images 104 were captured based on images 104 and the training of neural networks of model generator 102.

Segmentation masks 106 may include multiple segmentation masks 106 indicative of segments of the object. Each of segmentation masks 106 may be associated with one of images 104. For example, a given segmentation mask 106 may include a value corresponding to each pixel of an associated image 104. The values may be indicative of a label of the corresponding pixel. For example, the depicted image 104 may include 512-by-512 RGB pixels (e.g., 512-by-512 values indicative of color). The depicted segmentation mask 106 may include values 512*512 values (e.g., which may be arranged in a 512-by-512 grid for ease of illustration). The values of the segmentation mask 106 may be indicative of labels of corresponding pixels. For example, the depicted segmentation mask 106 may include values of "1" in positions in the segmentation mask corresponding to pixels of image 104 labeled "hair."

In some examples, there may be multiple (e.g., as many segmentation masks 106 as there are labels) for each one of image 104. In such examples, each segmentation mask 106 may be indicative of a single label (e.g., each segmentation mask 106 may store a "1" for pixels with the label and a value of "o" for pixels without the label). In other examples, one segmentation mask 106 may store values indicative of multiple labels. In such examples, a single segmentation mask 106 may store one value indicative of a first label and a different value indicative of a different label (e.g., a segmentation mask 106 may store a "1" for pixels with the label "hair," a "2" for pixels with the label "eyes," a "3" for pixels with the label "nose," etc.)

Model 108 may be a semantically-labelled three-dimensional model 108 of the object represented by images 104 and segmentation masks 106. Model 108 may be, or may include a point cloud, a mesh, etc. Model 108 may include label information for each point or vertex of model 108.

Model generator 102 may receive images 104 and segmentation masks 106 as inputs and may generate model 108. Model generator 102 may train a multi-view reconstruction network using images 104 and segmentation masks 106 as inputs and as ground truth. Model generator 102 may then extract (e.g., make explicit) an implicit neural representation of the trained multi-view reconstruction network.

Figure 2:
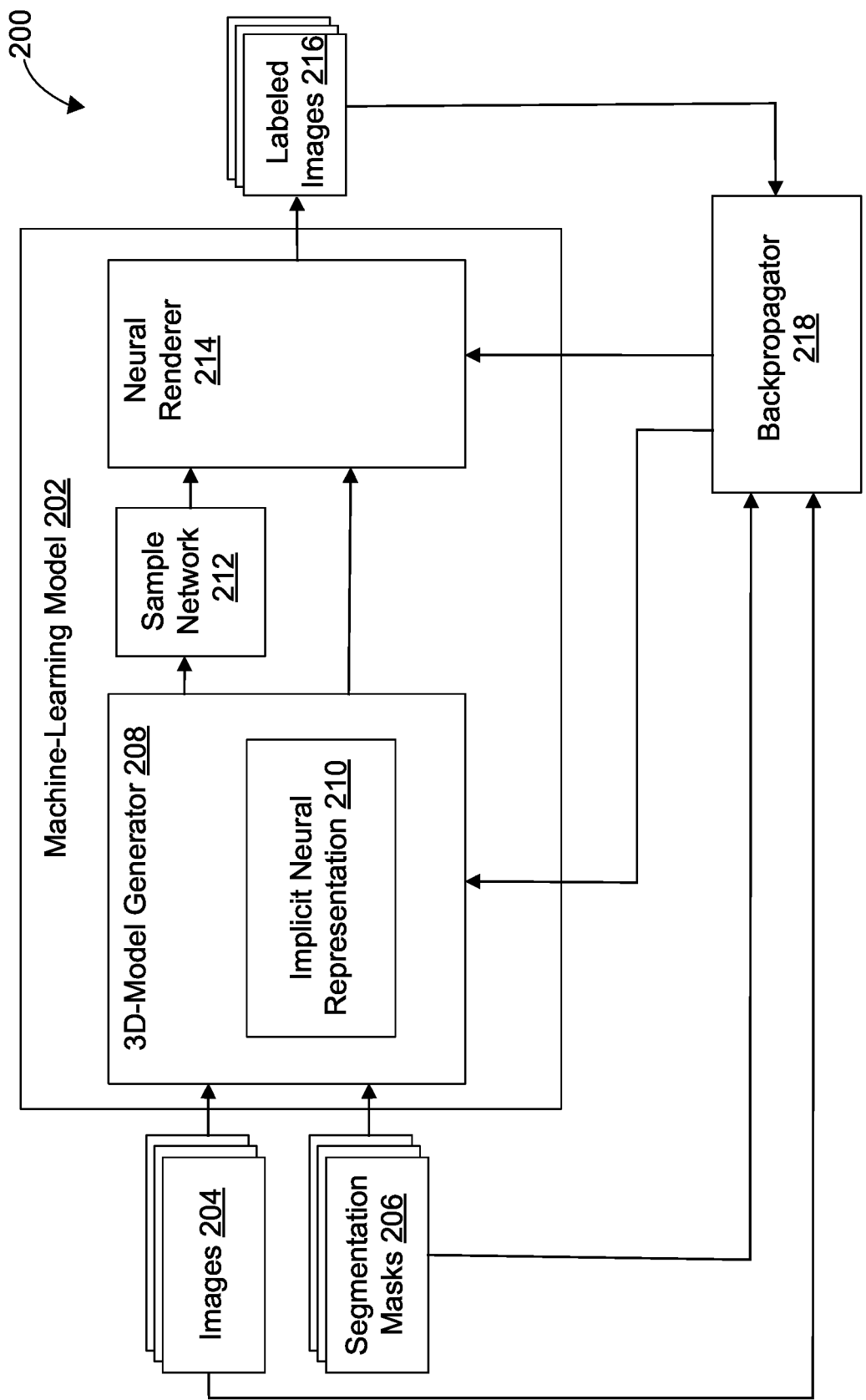
FIG. 2 is a block diagram illustrating a system for training a machine-learning model, according to various aspects of the present disclosure.

FIG. 2 is a block diagram illustrating a system 200 for training a machine-learning model 202 (which, once trained, may be used to generate a semantically-labelled three-dimensional model), according to various aspects of the present disclosure. System 200 may use images 204 and segmentation masks 206 as inputs, and as ground truth, in training machine-learning model 202 through an end-to-end backpropagation process.

Images 204 may be the same as, or substantially similar to, images 104 of FIG. 1. Segmentation masks 206 may be the same as, or substantially similar to, segmentation mask 106 of FIG. 1.

System 200 may perform some of the operations described above with regard to model generator 102 of FIG. 1. For example, system 200 may train, through an end-to-end backpropagation process, machine-learning model 202 (including an implicit neural representation 210 and a neural renderer 214) based on images 204 and segmentation masks 206 to generate an implicit neural representation (within the weights of implicit neural representation 210 and neural renderer 214) of an object represented in images 104 and segmentation masks 206.

System 200 may provide images 204 and segmentation masks 206 to machine-learning model 202. Machine-learning model 202 may, using three-dimensional-model generator 208, generate, through the end-to-end backpropagation process, implicit neural representation 210 of the object represented by images 204 and segmentation masks 206. Implicit neural representation 210 may be, or may include, weights between nodes of layers of a neural network (e.g., a multi-view reconstruction network). Implicit neural representation 210 may implicitly represent geometry of the object.

Figure 3:
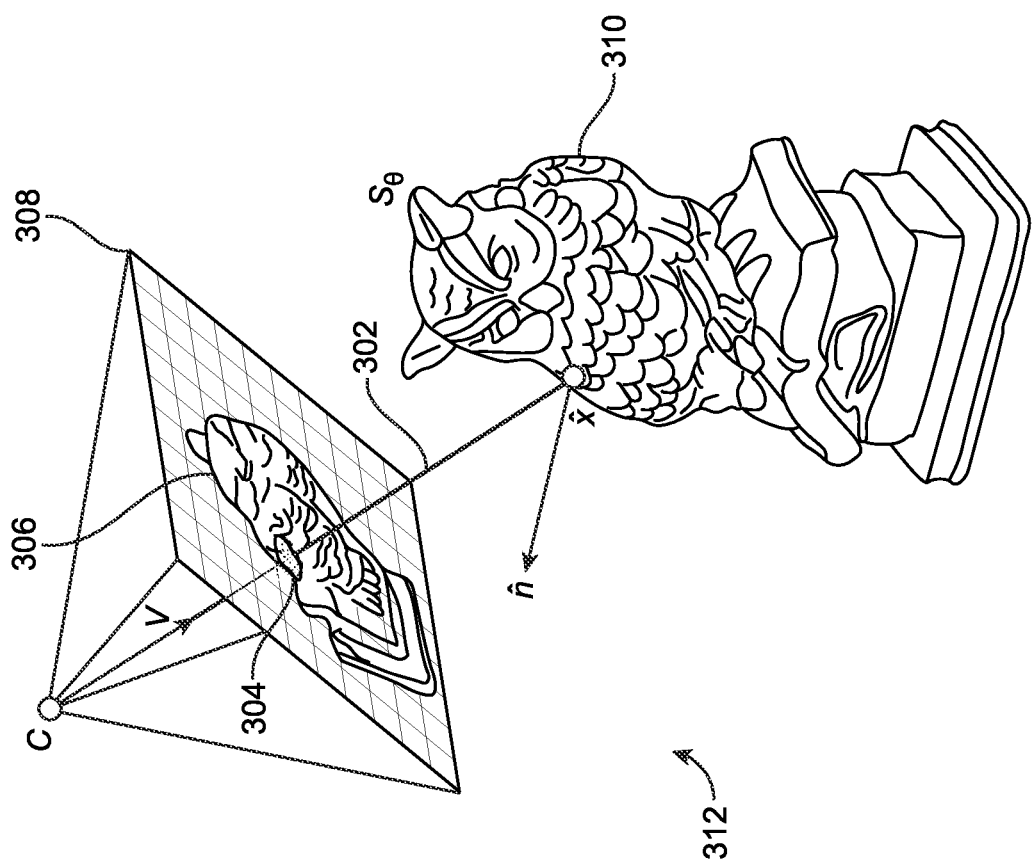
FIG. 3 is a diagram illustrating a simulated ray projected through pixel of an image of a simulated image plane into a simulated three-dimensional volume, according to various aspects of the present disclosure.

Implicit neural representation 210 may be configured to receive a viewing ray (which may be defined by "c+$t_0$v," where "c" is the camera position, "v" is a vector defining a direction between "c" and a pixel location "p", "t" is a scale variable that, at least in part, defines the length of the vector v, and "$t_0$" is a scale initialization). Additionally, implicit neural representation 210 may provide occupancy values along the ray. Implicit neural representation 210 may generate a surface function "f" and occupancy values for a given viewing ray may be given by "f(c+$t_0$v)". Implicit neural representation 210 may be configured to receive a viewing ray and to provide information regarding whether the object occupies a number of points along the ray. FIG. 3 illustrates a simulated ray 302 projected through pixel 304 of an image 306 of a simulated image plane 308 into a simulated three-dimensional volume 312. Implicit neural representation 210 may receive a viewing ray c+t₀v and may return values indicative of points along the viewing ray that are occupied by object 310.

Returning to FIG. 2, outputs from implicit neural representation 210 (including f(c+t₀v) may be provided to sample network 212. $\hat{x}$ represents intersection of the viewing ray c+tv with the implicit surface. $\hat{n}$ represents the normal of the surface at a given $\hat{x}$. Sample network 212 may represent $\hat{x}$ and $\hat{n}$ as differentiable functions of the implicit geometry and camera parameters. For example, $$\hat{x} = c + t_0 v - \frac{v}{\nabla f_0 \cdot v_0} f(c + t_0 v); \text{ and}$$

$$\hat{n} = \nabla f(\hat{x}).$$

Sample network 212 may receive, f(c+t₀v) from implicit neural representation 210. Additionally, sample network 212 may receive c and v corresponding to the viewing ray (e.g., from machine-learning model 202). Sample network 212 may determine $\hat{x}$ and $\hat{n}$ for the c and v.

Implicit neural representation 210 may provide a feature vector $\hat{z}$ to neural renderer 214. Sample network 212 may provide $\hat{x}$ and $\hat{n}$ to neural renderer 214. Additionally, v may be provided to neural renderer 214 (e.g., from machine-learning model 202).

Neural renderer 214 may, be a multilayer perceptron that may be trained, through the end-to-end backpropagation process, to render labeled images 216 based on inputs from implicit neural representation 210 and sample network 212. Neural renderer 214 may, based on a number of sets of v, $\hat{x}$, $\hat{n}$, and $\hat{z}$, render a labeled image 216 of the object, as represented by implicit neural representation 210, from a camera position e and a viewing direction v. Labeled image 216 may include an RGB image of the object as well as labels associated with segments of the RGB image.

While training machine-learning model 202 through the end-to-end backpropagation process, machine-learning model 202 may be given camera positions and viewing angles corresponding to images 204 and segmentation masks 206. Backpropagator 218 may use images 204 and segmentation masks 206 as ground truth and may compare labeled images 216 generated by machine-learning model 202 to images 204 and segmentation masks 206 to determine a loss, for example, according to:

$$\text{loss} = \sum_r \|C_p(r) - C_g(r)\|^2$$

where C is the label information (e.g., with a value of 0 representing background, a value of 1 representing any semantic information to be reconstructed, etc.). $C_p$ includes outputs sampled from the model and Cg may include ground-truth annotations. Gamma is the parameter to be optimized in training the model.

Machine-learning model 202 may update weights of implicit neural representation 210 and/or neural renderer 214 based on information from backpropagator 218 to improve, through the end-to-end backpropagation process, implicit neural representation 210 and neural renderer 214 to better render labeled image 216.

Once trained, machine-learning model 202 may be capable of generating new semantically-labelled two-dimensional images of the object represented in images 204 and segmentation masks 206 from camera positions and viewing angles not represented in images 204 and segmentation masks 206.

Figure 4:
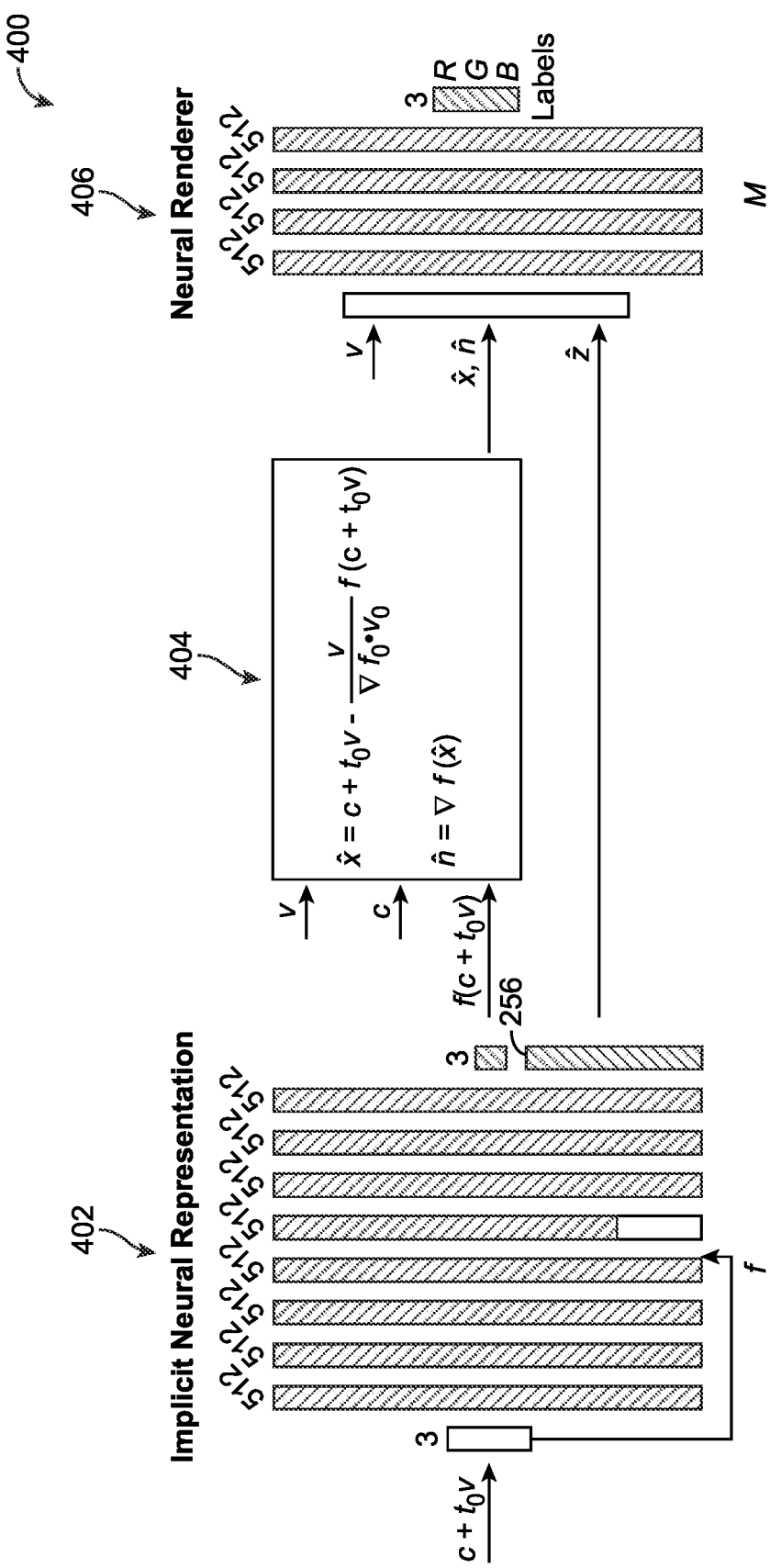
FIG. 4 is a block diagram illustrating a machine-learning model to generate one or more semantically-labelled three-dimensional models, according to various aspects of the present disclosure.

FIG. 4 is a block diagram illustrating a machine-learning model 400 (which, once trained, may be used to generate a semantically-labelled three-dimensional model), according to various aspects of the present disclosure. Machine-learning model 400 includes implicit neural representation 402 (which may be the same as, substantially similar to, or perform the same, or substantially the same, operations as implicit neural representation 210 of FIG. 2), sample network 404 (which may be the same as, substantially similar to, or perform the same, or substantially the same, operations as sample network 212 of FIG. 2), and neural renderer 406 (which may be the same as, substantially similar to, or perform the same, or substantially the same, operations as neural renderer 214 of FIG. 2).

Machine-learning model 400 may produce differentiable RGB values and corresponding label values for learnable camera positions c and some fixed image pixel p as follows. The camera parameters and pixel are used to define a viewing direction v. $\hat{x}$ is defined as the intersection of the viewing ray c+tv with the implicit surface.

Sample network 404 represents $\hat{x}$, and the normal to the surface $\hat{n}$ as differentiable functions of the implicit geometry and camera parameters.

The final radiance reflected from the geometry toward the camera e in direction v. i.e., RGB and corresponding label values, are approximated by the neural renderer 406. Neural renderer 406 may be a multilayer perceptron that takes as input the surface point $\hat{x}$ and normal $\hat{n}$, the viewing direction v, and a global geometry feature vector z.

In turn, the model is incorporated in a loss comparing it to the ground truth pixel color and label info, that enables learning simultaneously the geometry, its appearance and camera parameters, and the label.

Figure 5:
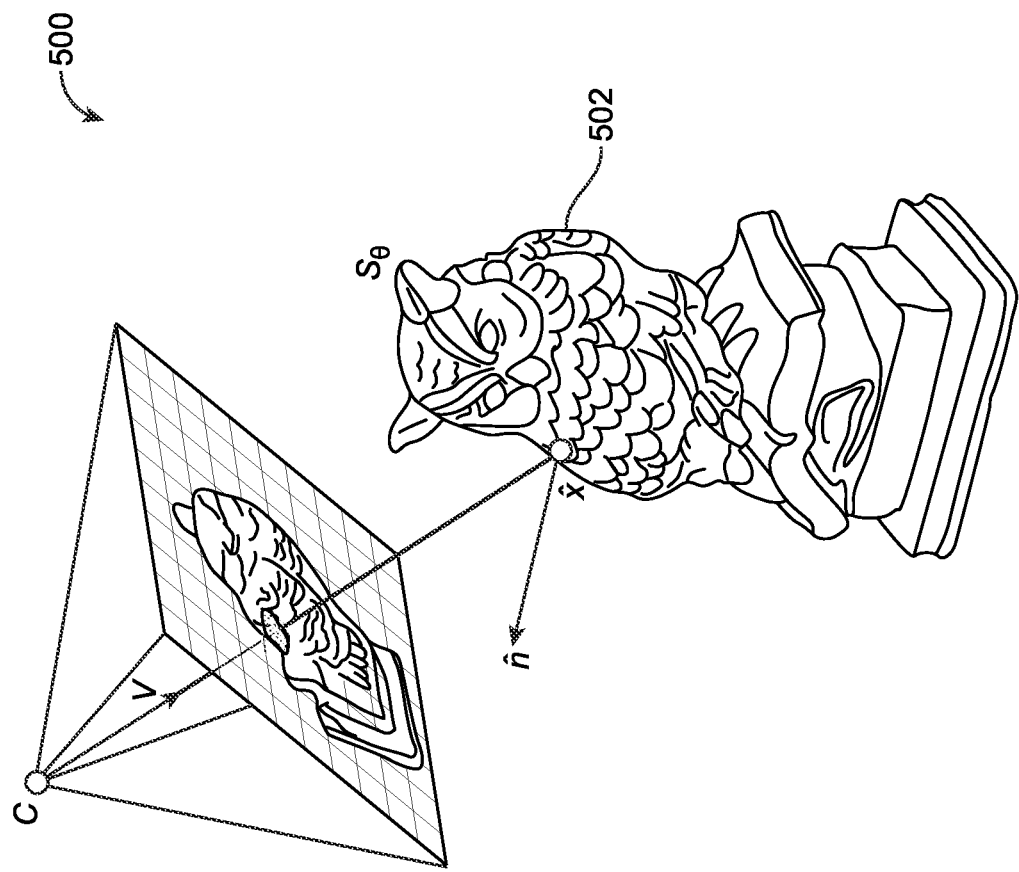
FIG. 5 is a diagram illustrating an example semantically-labelled three-dimensional model to provide context for a description of generating the semantically-labelled three-dimensional model, according to various aspects of the present disclosure.

FIG. 5 is a diagram 500 illustrates an example semantically-labelled three-dimensional model 502 to provide context for a description of generating the semantically-labelled three-dimensional model 502, according to various aspects of the present disclosure.

After a machine-learning model (e.g., machine-learning model 202 of FIG. 2, or machine-learning model 400 of FIG. 4) is trained (e.g., through the end-to-end backpropagation process described with regard to FIG. 2 or FIG. 4), the implicit neural representations of the machine-learning model can be sampled at various points. For example, various camera locations c and various viewing angles v can be provided to the trained machine-learning model. The trained machine-learning model will provide labelled images of the object as viewed from the locations c and the viewing angles v. The camera locations c and viewing angles v may cover the whole object and may use the occupancy network (e.g., implicit neural representation 210 of FIG. 2 or implicit neural representation 402 of FIG. 4) to find the surface point. The color and label of surface point can also be obtained in the same way using the RGB-and-label density field (e.g., of neural renderer 214 of FIG. 2 or neural renderer 406 of FIG. 4). As an example, each point of a three-dimensional space (e.g., each voxel of the three-dimensional space) may be sampled by providing corresponding camera locations c and viewing angles v to determine a point-cloud representation as model 502. In some cases, bounding boxes may be applied to reduce the number of sampling points when sampling the three-dimensional space.

A point-cloud representation of the surface of the object may be generated by sampling the implicit neural representation of the trained machine-learning model. Further, each point of the point cloud may be associated with a label. A Poisson reconstruction algorithm can be used to extract the mesh from the point-cloud representation. Moreover, vertex labels can also be derived from the point cloud. Thus a semantically-label three dimensional model of the object (and/or three-dimensional semantic labels (e.g., three-dimensional models of each of the semantic labels)) may be generated. The semantically-labelled three-dimensional model (and/or three-dimensional semantic labels) can be rendered from any point of view. The rendered semantically-labelled three-dimensional model (and/or the rendered three-dimensional semantic labels) may be multiview-consistent, For example, semantically-labelled three-dimensional model (and/or three-dimensional semantic labels) may be consistent independent of which point of view the model and/or labels are rendered from. The semantically-labelled three-dimensional model (and/or three-dimensional semantic labels) may be used in many different applications, such as video editing.

Figure 6:
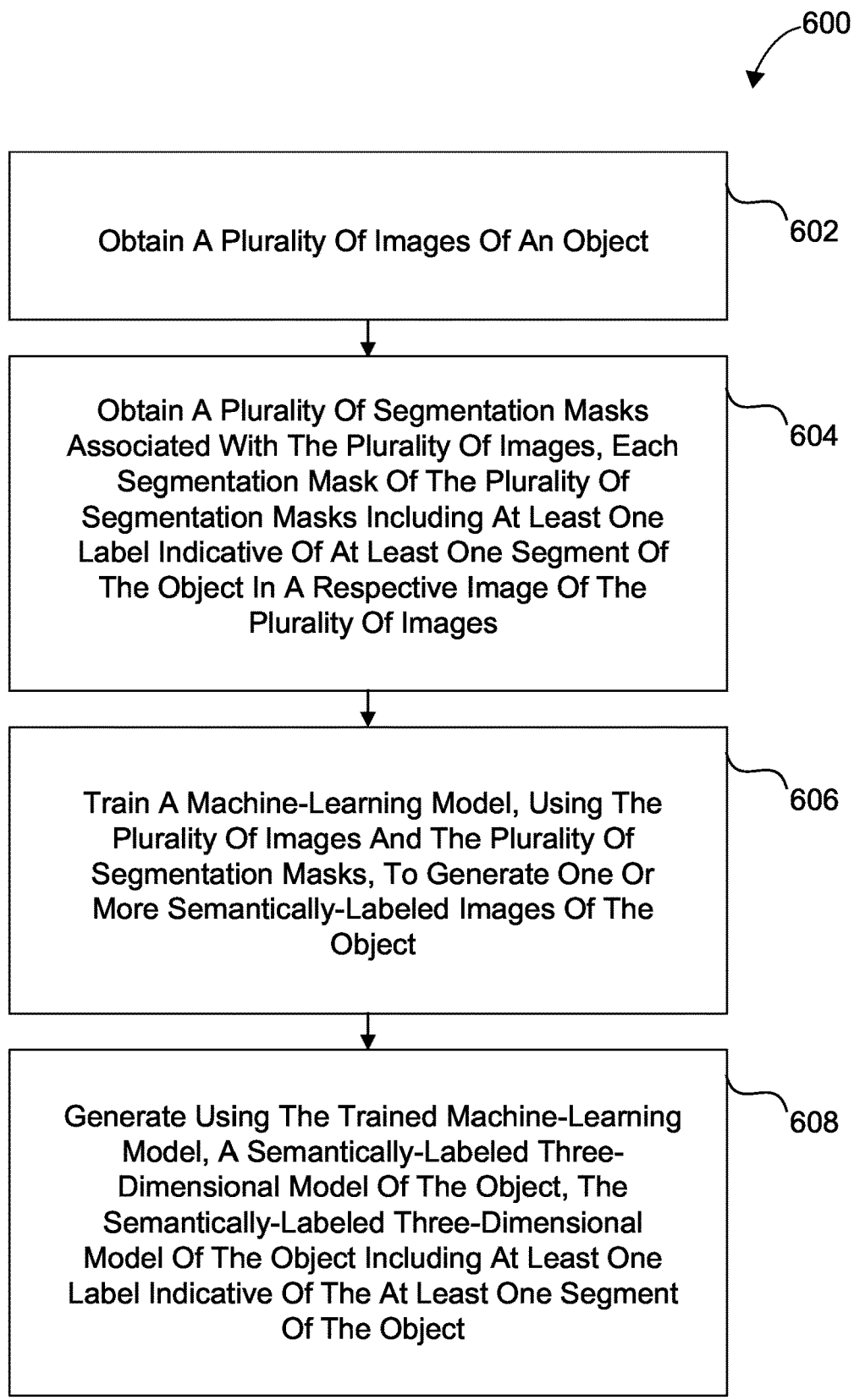
FIG. 6 is a diagram illustrating an example of a process for generating a semantically-labelled three-dimensional model, according to various aspects of the present disclosure.

FIG. 6 illustrates an example of a process 600 for generating a semantically-labelled three-dimensional model, according to aspects of the according to various aspects of the present disclosure. The process 600 may be performed by a computing device (or apparatus) or a component (e.g., a chipset, one or more processors, etc.) of the computing device. The computing device may be an extended reality (XR) device (e.g., a virtual reality (VR) device or augmented reality (AR) device), a mobile device (e.g., a mobile phone), a vehicle or computing device or system of the vehicle, a network-connected wearable such as a watch, a desktop computing device, a tablet computing device, a server computer, a robotic device, a television, and/or any other computing device with the resource capabilities to perform the process 600. In one example, the process 600 can be performed by system 100 of FIG. 1 or system 200 of FIG. 2. In another example, one or more of the methods can be performed by the computing system 900 shown in FIG. 9. For instance, a computing device with the computing system 900 shown in FIG. 9 can include the components of the system 100, the system 200, and/or the machine-learning model 400 of FIG. 4 and can implement the operations of the process 600 of FIG. 6, and/or other process described herein. The operations of the process 600 may be implemented as software components that are executed and run on one or more compute components or processors (e.g., processor 902 of FIG. 9, or other processor(s)). Transmission and reception of signals by the computing device in the process 600 may be enabled, for example, by one or more antennas, one or more transceivers (e.g., wireless transceiver(s)), and/or other communication components (e.g., the communication interface 926 of FIG. 9, or other antennae(s), transceiver(s), and/or component(s)).

At block 602, the computing device (or component thereof) may obtain a plurality of images of an object. For example, model generator 102 of FIG. 1 may obtain images 104 of FIG. 1. As another example, system 200 of FIG. 2 may obtain images 204 of FIG. 2.

At block 604, the computing device (or component thereof) may obtain a plurality of segmentation masks associated with the plurality of images, each segmentation mask of the plurality of segmentation masks including at least one label indicative of at least one segment of the object in a respective image of the plurality of images. For example, model generator 102 may obtain segmentation masks 106 of FIG. 1. As another example, system 200 may obtain segmentation masks 206 of FIG. 2. In some aspects, the computing device (or one or more components thereof) may to generate, using a trained semantic-segmentation machine-learning model, the plurality of segmentation masks based on the plurality of images. In some aspects, each segmentation mask of the plurality of segmentation masks may include a plurality of values, wherein each value of the plurality of values corresponds to a pixel of an associated image, and wherein each value of the plurality of values is indicative of a label.

At block 606, the computing device (or component thereof) may train, using the plurality of images and the plurality of segmentation masks, a machine-learning model to generate one or more semantically-labeled three-dimensional models of the object. For example, model generator 102 may train a machine-learning model using images 104 and segmentation masks 106. As another example, system 200 may train machine-learning model 202 of FIG. 2 using images 204 and segmentation masks 206.

In some aspects, the machine-learning model may be a multi-view reconstruction network including a dimension for labels. In some aspects, the machine-learning model may be a neural radiance field including a dimension for labels. In some aspects, the machine-learning model may be trained using the plurality of images (e.g., obtained at block 602), relative locations from which the plurality of images were captured, and the plurality of segmentation masks (e.g., obtained at block 604). In some aspects, the machine-learning model may be trained to receive, as an input, a location; and output a simulated image of the object as captured from the location and information indicative of labels of segments of the simulated image.

At block 608, the computing device (or component thereof) may generate using the trained machine-learning model, a semantically-labeled three-dimensional model of the object, the semantically-labeled three-dimensional model of the object including at least one label indicative of the at least one segment of the object. For example, model generator 102, using the machine-learning model trained at block 608 may generate model 108. As another example, system 200, using machine-learning model 202, may generate a semantically-labeled three-dimensional model of the object.

In some aspects, the semantically-labeled three-dimensional model of the object of block 608 may be a multi-view consistent feature space. In some aspects, to generating the semantically-labeled three-dimensional model of the object may include: providing a plurality of locations as inputs to the trained machine-learning model, receiving, from the trained machine-learning model, a plurality of occupancy values and labels; and generating the semantically-labeled three-dimensional model of the object based on the plurality of occupancy values and labels.

As noted above, the processes or methods described herein (e.g., process 600 and/or other methods described herein) can be performed by a computing device, apparatus, or system. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 600 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine learning models or systems.

Figure 7:
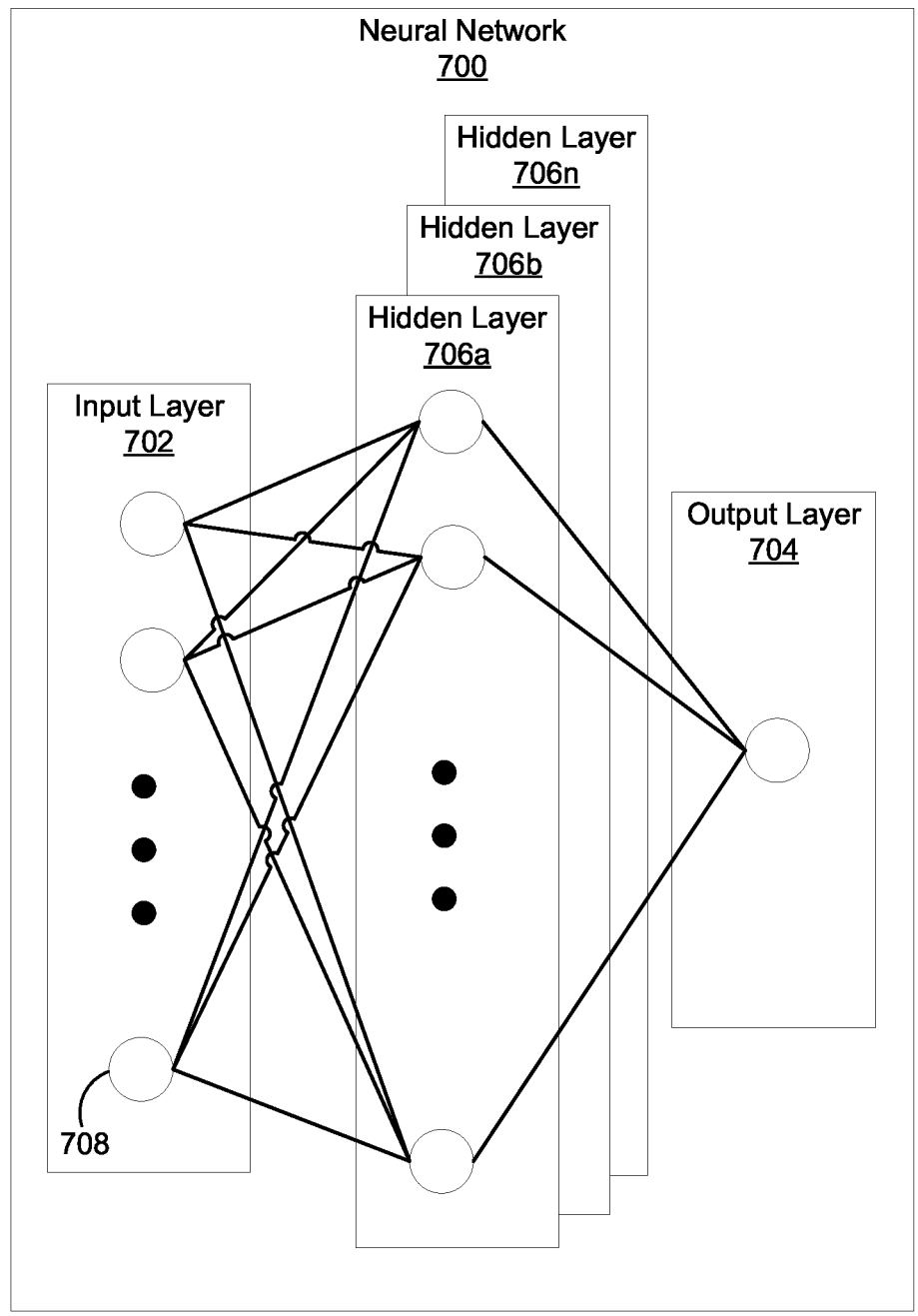
FIG. 7 is a diagram illustrating an example of a deep learning neural network, according to various aspects of the present disclosure.

FIG. 7 is an illustrative example of a neural network 700 (e.g., a deep-learning neural network) that can be used to implement the machine-learning based feature segmentation, implicit-neural-representation generation, rendering, and/or classification described above. Neural network 700 may be an example of implicit neural representation 210 of FIG. 2, neural renderer 214 of FIG. 2, implicit neural representation 402 of FIG. 4, neural renderer 406 of FIG. 4, or a neural network used to generate segmentation masks 106 based on images 104.

An input layer 702 includes input data. In one illustrative example, input layer 702 can include data representing the pixels of an input image or values of a segmentation mask. Neural network 700 includes multiple hidden layers 706a, 706b, through 706n. The hidden layers 706a, 706b, through 706n include "n" number of hidden layers, where "n" is an integer greater than or equal to one. The number of hidden layers can be made to include as many layers as needed for the given application. Neural network 700 further includes an output layer 704 that provides an output resulting from the processing performed by the hidden layers 706a, 706b, through 706n. In one illustrative example, output layer 704 can provide a labeled two-dimensional image.

Neural network 700 can be, or can include, a multi-layer neural network of interconnected nodes. Each node can represent a piece of information. Information associated with the nodes is shared among the different layers and each layer retains information as information is processed. In some cases, neural network 700 can include a feed-forward network, in which case there are no feedback connections where outputs of the network are fed back into itself. In some cases, neural network 700 can include a recurrent neural network, which can have loops that allow information to be carried across nodes while reading in input.

Information can be exchanged between nodes through node-to-node interconnections between the various layers. Nodes of input layer 702 can activate a set of nodes in the first hidden layer 706a. For example, as shown, each of the input nodes of input layer 702 is connected to each of the nodes of the first hidden layer 706a. The nodes of first hidden layer 706a can transform the information of each input node by applying activation functions to the input node information. The information derived from the transformation can then be passed to and can activate the nodes of the next hidden layer 706b, which can perform their own designated functions. Example functions include convolutional, up-sampling, data transformation, and/or any other suitable functions. The output of the hidden layer 706b can then activate nodes of the next hidden layer, and so on. The output of the last hidden layer 706n can activate one or more nodes of the output layer 704, at which an output is provided. In some cases, while nodes (e.g., node 708) in neural network 700 are shown as having multiple output lines, a node has a single output and all lines shown as being output from a node represent the same output value.

In some cases, each node or interconnection between nodes can have a weight that is a set of parameters derived from the training of neural network 700. Once neural network 700 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 700 to be adaptive to inputs and able to learn as more and more data is processed.

Neural network 700 may be pre-trained to process the features from the data in the input layer 702 using the different hidden layers 706a, 706b, through 706n in order to provide the output through the output layer 704. In an example in which neural network 700 is used to identify features in images, neural network 700 can be trained using training data that includes both images and labels, as described above. For instance, training images can be input into the network, with each training image having a label indicating the features in the images (for the feature segmentation machine learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 700 is trained well enough so that the weights of the layers are accurately tuned.

For the example of identifying objects in images, the forward pass can include passing a training image through neural network 700. The weights are initially randomized before neural network 700 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 700, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 700 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dw},$$

wherein w denotes a weight, $w_i$ denotes the initial weight, and n denotes a learning rate. The learning rate can be set to any suitable value, with a high learning rate including larger weight updates and a lower value indicating smaller weight updates.

Neural network 700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 700 can include any other deep network other than a CNN, such as an autoencoder, a deep belief nets (DBNs), a Recurrent Neural Networks (RNNs), among others.

Figure 8:
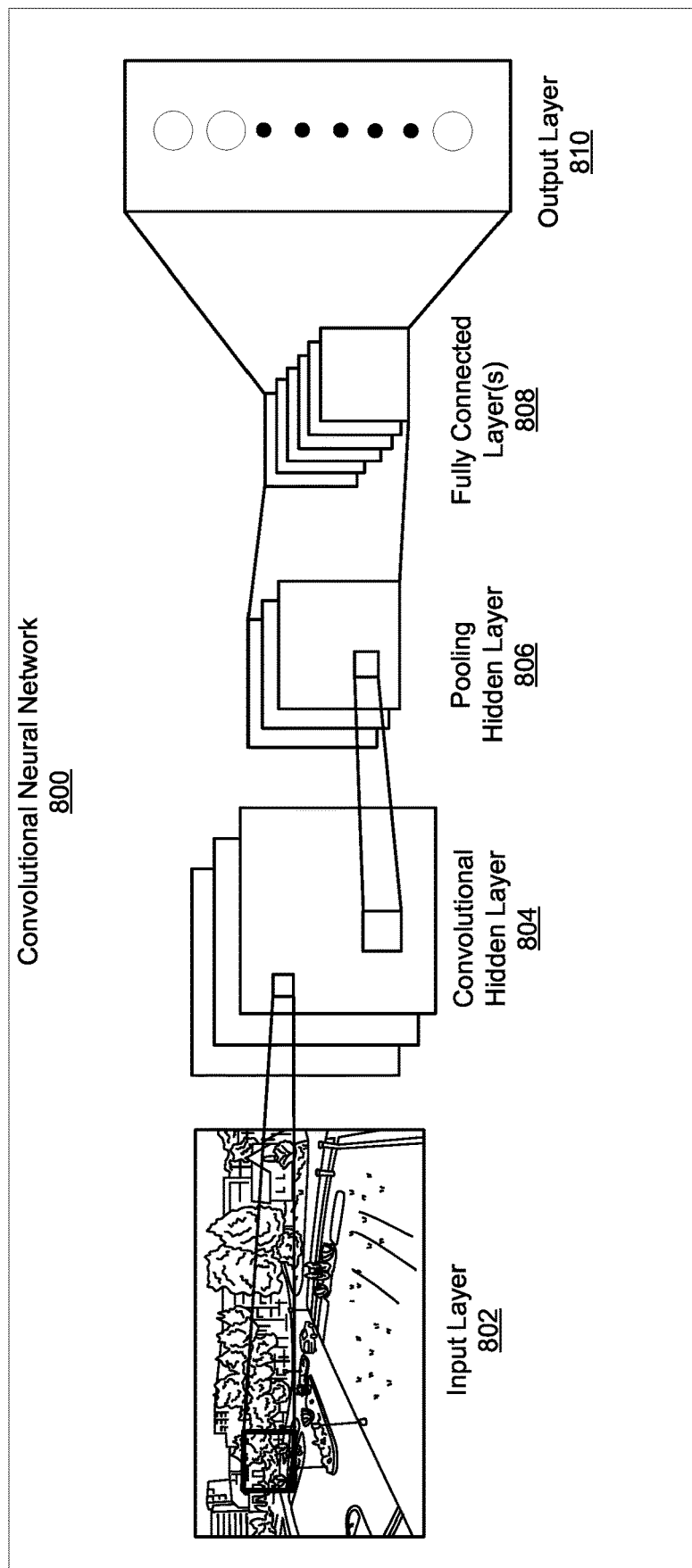
FIG. 8 is a diagram illustrating an example of a convolutional neural network (CNN), earlier today, according to various aspects of the present disclosure.

FIG. 8 is an illustrative example of a convolutional neural network (CNN) 800. The input layer 802 of the CNN 800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 804, an optional non-linear activation layer, a pooling hidden layer 806, and fully connected layer 808 (which fully connected layer 808 can be hidden) to get an output at the output layer 810. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 can be the convolutional hidden layer 804. The convolutional hidden layer 804 can analyze image data of the input layer 802. Each node of the convolutional hidden layer 804 is connected to a region of nodes (pixels) of the input image called a receptive field. The convolutional hidden layer 804 can be considered as one or more filters (each filter corresponding to a different activation or feature map), with each convolutional iteration of a filter being a node or neuron of the convolutional hidden layer 804. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 804. Each connection between a node and a receptive field for that node learns a weight and, in some cases, an overall bias such that each node learns to analyze its particular local receptive field in the input image. Each node of the convolutional hidden layer 804 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 804 is due to each node of the convolutional layer being applied to its corresponding receptive field. For example, a filter of the convolutional hidden layer 804 can begin in the top-left corner of the input image array and can convolve around the input image. As noted above, each convolutional iteration of the filter can be considered a node or neuron of the convolutional hidden layer 804. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 804. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 804.

The mapping from the input layer to the convolutional hidden layer 804 is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 804 can include several activation maps in order to identify multiple features in an image. The example shown in FIG. 8 includes three activation maps. Using three activation maps, the convolutional hidden layer 804 can detect three different kinds of features, with each feature being detectable across the entire image.

In some examples, a non-linear hidden layer can be applied after the convolutional hidden layer 804. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 800 without affecting the receptive fields of the convolutional hidden layer 804.

The pooling hidden layer 806 can be applied after the convolutional hidden layer 804 (and after the non-linear hidden layer when used). The pooling hidden layer 806 is used to simplify the information in the output from the convolutional hidden layer 804. For example, the pooling hidden layer 806 can take each activation map output from the convolutional hidden layer 804 and generates a condensed activation map (or feature map) using a pooling function. Max-pooling is one example of a function performed by a pooling hidden layer. Other forms of pooling functions be used by the pooling hidden layer 806, such as average pooling, L2-norm pooling, or other suitable pooling functions. A pooling function (e.g., a max-pooling filter, an L2-norm filter, or other suitable pooling filter) is applied to each activation map included in the convolutional hidden layer 804. In the example shown in FIG. 8, three pooling filters are used for the three activation maps in the convolutional hidden layer 804.

In some examples, max-pooling can be used by applying a max-pooling filter (e.g., having a size of 2×2) with a stride (e.g., equal to a dimension of the filter, such as a stride of 2) to an activation map output from the convolutional hidden layer 804. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 804 having a dimension of 24×24 nodes, the output from the pooling hidden layer 806 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

The pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 806 to every one of the output nodes in the output layer 810. Using the example above, the input layer includes 28×28 nodes encoding the pixel intensities of the input image, the convolutional hidden layer 804 includes 3×24×24 hidden feature nodes based on application of a 5×5 local receptive field (for the filters) to three activation maps, and the pooling hidden layer 806 includes a layer of 3×12×12 hidden feature nodes based on application of max-pooling filter to 2×2 regions across each of the three feature maps. Extending this example, the output layer 810 can include ten output nodes. In such an example, every node of the 3×12×12 pooling hidden layer 806 is connected to every node of the output layer 810.

The fully connected layer 808 can obtain the output of the previous pooling hidden layer 806 (which should represent the activation maps of high-level features) and determines the features that most correlate to a particular class. For example, the fully connected layer 808 can determine the high-level features that most strongly correlate to a particular class, and can include weights (nodes) for the high-level features. A product can be computed between the weights of the fully connected layer 808 and the pooling hidden layer 806 to obtain probabilities for the different classes. For example, if the CNN 800 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 810 can include an M-dimensional vector (in the prior example, M=10). M indicates the number of classes that the CNN 800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
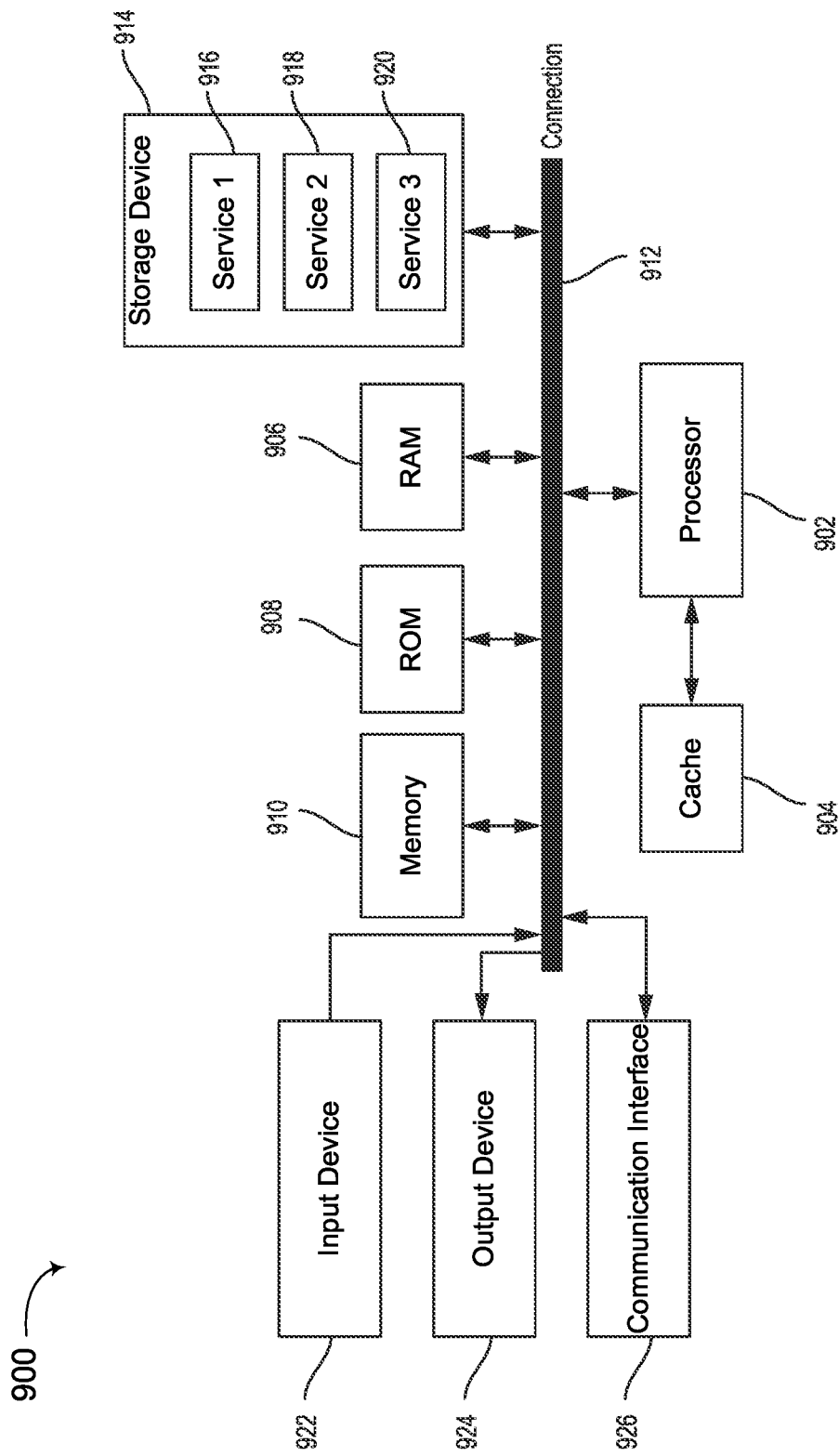
FIG. 9 is a diagram illustrating an example of a computing system, according to various aspects of the present disclosure.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 912. Connection 912 can be a physical connection using a bus, or a direct connection into processor 902, such as in a chipset architecture. Connection 912 can also be a virtual connection, networked connection, or logical connection.

In some aspects, computing system 900 can be a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 900 includes at least one processing unit (CPU or processor) 902 and connection 912 that couples various system components including system memory 910, such as read-only memory (ROM) 908 and random-access memory (RAM) 906 to processor 902. Computing system 900 can include a cache 904 of high-speed memory connected directly with, in close proximity to, or integrated as part of processor 902.

Processor 902 can include any general-purpose processor and a hardware service or software service, such as services 916, 918, and 920 stored in storage device 914, configured to control processor 902 as well as a special-purpose processor where software instructions are incorporated into the actual processor design. Processor 902 can essentially be a completely self-contained computing system, containing multiple cores or processors, a bus, memory controller, cache, etc. A multi-core processor can be symmetric or asymmetric.

To enable user interaction, computing system 900 includes an input device 922, which can represent any number of input mechanisms, such as a microphone for speech, a touch-sensitive screen for gesture or graphical input, keyboard, mouse, motion input, speech, etc. Computing system 900 can also include output device 924, which can be one or more of a number of output mechanisms. In some instances, multimodal systems can enable a user to provide multiple types of input/output to communicate with computing system 900. Computing system 900 can include communication interface 926, which can generally govern and manage the user input and system output. Communication interface 926 can perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 can also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 914 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random-access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 914 can include software services, servers, services, etc., that when the code that defines such software is executed by the processor 902, it causes the system to perform a function. In some aspects, a hardware service that performs a particular function can include the software component stored in a computer-readable medium in connection with hardware components, such as processor 902, connection 912, output device 924, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium can include a non-transitory medium in which data can be stored and that does not include carrier waves and/or transitory electronic signals propagating wirelessly or over wired connections. Examples of a non-transitory medium can include, but are not limited to, a magnetic disk or tape, optical storage media such as compact disk (CD) or digital versatile disk (DVD), flash memory, memory or memory devices. A computer-readable medium can have stored thereon code and/or machine-executable instructions that can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects can be practiced without these specific details. For clarity of explanation, in some instances the present technology can be presented as including individual functional blocks including functional blocks comprising devices, device components, steps or routines in a method embodied in software, or combinations of hardware and software. Additional components can be used other than those shown in the figures and/or described herein. For example, circuits, systems, networks, processes, and other components can be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects can be described above as a process or method which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions can be, for example, binaries, intermediate format instructions such as assembly language, firmware, source code, etc. Examples of computer-readable media that can be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform tasks (e.g., a computer-program product) can be stored in a computer-readable or machine-readable medium. A processor(s) can perform the tasks. Typical examples of form factors include laptops, smart phones, mobile phones, tablet devices or other small form factor personal computers, personal digital assistants, rack-mount devices, standalone devices, and so on Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts can be otherwise variously embodied and employed, and that the appended claims are intended to be construed to include such variations, except as limited by the prior art. Various features and aspects of the above-described application can be used individually or jointly. Further, aspects can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate aspects, the methods can be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein can be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application.

The techniques described herein can also be implemented in electronic hardware, computer software, firmware, or any combination thereof. Such techniques can be implemented in any of a variety of devices such as general-purpose computers, wireless communication device handsets, or integrated circuit devices having multiple uses including application in wireless communication device handsets and other devices. Any features described as modules or components can be implemented together in an integrated logic device or separately as discrete but interoperable logic devices. If implemented in software, the techniques can be realized at least in part by a computer-readable data storage medium comprising program code including instructions that, when executed, performs one or more of the methods described above. The computer-readable data storage medium can form part of a computer program product, which can include packaging materials. The computer-readable medium can comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, can be realized at least in part by a computer-readable communication medium that carries or communicates program code in the form of instructions or data structures and that can be accessed, read, and/or executed by a computer, such as propagated signals or waves.

The program code can be executed by a processor, which can include one or more processors, such as one or more digital signal processors (DSPs), general-purpose microprocessors, an application specific integrated circuits (ASICs), field programmable logic arrays (FPGAs), or other equivalent integrated or discrete logic circuitry Such a processor can be configured to perform any of the techniques described in this disclosure. A general-purpose processor can be a microprocessor; but in the alternative, the processor can be any conventional processor, controller, microcontroller, or state machine. A processor can also be implemented as a combination of computing devices, (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for generating one or more three-dimensional models, the apparatus comprising: at least one memory; and at least one processor coupled to the at least one memory and configured to: obtain a plurality of images of an object; obtain a plurality of segmentation masks associated with the plurality of images, each segmentation mask of the plurality of segmentation masks including at least one label indicative of at least one segment of the object in a respective image of the plurality of images; train, using the plurality of images and the plurality of segmentation masks, a machine-learning model to generate one or more semantically-labeled three-dimensional models of the object; and generate using the trained machine-learning model, a semantically-labeled three-dimensional model of the object, the semantically-labeled three-dimensional model of the object including at least one label indicative of the at least one segment of the object.

Aspect 2. The apparatus of aspect 1, wherein the semantically-labeled three-dimensional model of the object comprises a multi-view consistent feature space.

Aspect 3. The apparatus of any one of aspect 1 or 2, wherein to generate the semantically-labeled three-dimensional model of the object, the at least one processor is configured to: provide a plurality of locations as inputs to the trained machine-learning model; receive, from the trained machine-learning model, a plurality of occupancy values and labels; and generate the semantically-labeled three-dimensional model of the object based on the plurality of occupancy values and labels.

Aspect 4. The apparatus of any one of aspects 1 to 3, wherein the machine-learning model comprises a multi-view reconstruction network including a dimension for labels.

Aspect 5. The apparatus of any one of aspects 1 to 4, wherein the machine-learning model comprises a neural radiance field including a dimension for labels.

Aspect 6. The apparatus of any one of aspects 1 to 5, wherein the machine-learning model is trained using the plurality of images, relative locations from which the plurality of images were captured, and the plurality of segmentation masks.

Aspect 7. The apparatus of any one of aspects 1 to 6, wherein the trained machine-learning model is configured to: receive, as an input, a location; and output a simulated image of the object as captured from the location and information indicative of labels of segments of the simulated image.

Aspect 8. The apparatus of any one of aspects 1 to 7, wherein to obtain the plurality of segmentation masks, the at least one processor is configured to generate, using a trained semantic-segmentation machine-learning model, the plurality of segmentation masks based on the plurality of images.

Aspect 9. The apparatus of any one of aspects 1 to 8, wherein each segmentation mask of the plurality of segmentation masks comprises a plurality of values, wherein each value of the plurality of values corresponds to a pixel of an associated image, and wherein each value of the plurality of values is indicative of a label.

Aspect 10. A method for generating one or more three-dimensional models, the method comprising: obtaining a plurality of images of an object; obtaining a plurality of segmentation masks associated with the plurality of images, each segmentation mask of the plurality of segmentation masks including at least one label indicative of at least one segment of the object in a respective image of the plurality of images; training, using the plurality of images and the plurality of segmentation masks, a machine-learning model to generate one or more semantically-labeled three-dimensional models of the object; and generating using the trained machine-learning model, a semantically-labeled three-dimensional model of the object, the semantically-labeled three-dimensional model of the object including at least one label indicative of the at least one segment of the object.

Aspect 11. The method of aspect 10, wherein the semantically-labeled three-dimensional model of the object comprises a multi-view consistent feature space.

Aspect 12. The method of any one of aspects 10 or 11, wherein generating the semantically-labeled three-dimensional model of the object comprises: providing a plurality of locations as inputs to the trained machine-learning model; receiving, from the trained machine-learning model, a plurality of occupancy values and labels; and generating the semantically-labeled three-dimensional model of the object based on the plurality of occupancy values and labels.

Aspect 13. The method of any one of aspects 10 to 12, wherein the machine-learning model comprises a multi-view reconstruction network including a dimension for labels.

Aspect 14. The method of any one of aspects 10 to 13, wherein the machine-learning model comprises a neural radiance field including a dimension for labels.

Aspect 15. The method of any one of aspects 10 to 14, wherein the machine-learning model is trained using the plurality of images, relative locations from which the plurality of images were captured, and the plurality of segmentation masks.

Aspect 16. The method of any one of aspects 10 to 15, wherein the trained machine-learning model is configured to: receive, as an input, a location; and output a simulated image of the object as captured from the location and information indicative of labels of segments of the simulated image.

Aspect 17 The method of any one of aspects 10 to 16, wherein obtaining the plurality of segmentation masks comprises generating, using a trained semantic-segmentation machine-learning model, the plurality of segmentation masks based on the plurality of images.

Aspect 18. The method of any one of aspects 10 to 17, wherein each segmentation mask of the plurality of segmentation masks comprises a plurality of values, wherein each value of the plurality of values corresponds to a pixel of an associated image, and wherein each value of the plurality of values is indicative of a label.

Aspect 19. A non-transitory computer-readable storage medium having stored thereon instructions that, when executed by at least one processor, cause the at least one processor to perform operations according to any of aspects 10 to 18.

Aspect 20. An apparatus for providing virtual content for display, the apparatus comprising one or more means for perform operations according to any of aspects 10 to 18.

What is claimed is:

1. An apparatus for generating one or more three-dimensional models, the apparatus comprising:
at least one memory; and
at least one processor coupled to the at least one memory and configured to:
obtain a plurality of images of an object;
obtain a plurality of segmentation masks associated with the plurality of images, each segmentation mask of the plurality of segmentation masks including at least one label indicative of at least one segment of the object in a respective image of the plurality of images;
train, using the plurality of images and the plurality of segmentation masks, a machine-learning model to generate one or more semantically-labeled three-dimensional models of the object; and
generate using the trained machine-learning model, a semantically-labeled three-dimensional model of the object, the semantically-labeled three-dimensional model of the object including at least one label indicative of the at least one segment of the object.

2. The apparatus of claim 1, wherein the semantically-labeled three-dimensional model of the object comprises a multi-view consistent feature space.

3. The apparatus of claim 1, wherein to, generate the semantically-labeled three-dimensional model of the object, the at least one processor is configured to:
provide a plurality of locations as inputs to the trained machine-learning model;
receive, from the trained machine-learning model, a plurality of occupancy values and labels; and
generate the semantically-labeled three-dimensional model of the object based on the plurality of occupancy values and labels.

4. The apparatus of claim 1, wherein the machine-learning model comprises a multi-view reconstruction network including a dimension for labels.

5. The apparatus of claim 1, wherein the machine-learning model comprises a neural radiance field including a dimension for labels.

6. The apparatus of claim 1, wherein the at least one processor is configured to train the machine-learning model using the plurality of images, relative locations from which the plurality of images were captured, and the plurality of segmentation masks.

7. The apparatus of claim 1, wherein the trained machine-learning model is configured to:
receive, as an input, a location; and
output a simulated image of the object as captured from the location and information indicative of labels of segments of the simulated image.

8. The apparatus of claim 1, wherein, to obtain the plurality of segmentation masks, the at least one processor is configured to generate, using a trained semantic-segmentation machine-learning model, the plurality of segmentation masks based on the plurality of images.

9. The apparatus of claim 1, wherein each segmentation mask of the plurality of segmentation masks comprises a plurality of numerical values, wherein each numerical value of the plurality of numerical values corresponds to a pixel of an associated image, and wherein each numerical value of the plurality of numerical values is indicative of a label.

10. A method for generating one or more three-dimensional models, the method comprising:
   obtaining a plurality of images of an object;
   obtaining a plurality of segmentation masks associated with the plurality of images, each segmentation mask of the plurality of segmentation masks including at least one label indicative of at least one segment of the object in a respective image of the plurality of images;
   training, using the plurality of images and the plurality of segmentation masks, a machine-learning model to generate one or more semantically-labeled three-dimensional models of the object; and
   generating using the trained machine-learning model, a semantically-labeled three-dimensional model of the object, the semantically-labeled three-dimensional model of the object including at least one label indicative of the at least one segment of the object.

11. The method of claim 10, wherein the semantically-labeled three-dimensional model of the object comprises a multi-view consistent feature space.

12. The method of claim 10, wherein generating the semantically-labeled three-dimensional model of the object comprises:
   providing a plurality of locations as inputs to the trained machine-learning model;
   receiving, from the trained machine-learning model, a plurality of occupancy values and labels; and
   generating the semantically-labeled three-dimensional model of the object based on the plurality of occupancy values and labels.

13. The method of claim 10, wherein the machine-learning model comprises a multi-view reconstruction network including a dimension for labels.

14. The method of claim 10, wherein the machine-learning model comprises a neural radiance field including a dimension for labels.

15. The method of claim 10, wherein the machine-learning model is trained using the plurality of images, relative locations from which the plurality of images were captured, and the plurality of segmentation masks.

16. The method of claim 10, wherein the trained machine-learning model is configured to:
   receive, as an input, a location; and
   output a simulated image of the object as captured from the location and information indicative of labels of segments of the simulated image.

17. The method of claim 10, wherein obtaining the plurality of segmentation masks comprises generating, using a trained semantic-segmentation machine-learning model, the plurality of segmentation masks based on the plurality of images.

18. The method of claim 10, wherein each segmentation mask of the plurality of segmentation masks comprises a plurality of numerical values, wherein each numerical value of the plurality of numerical values corresponds to a pixel of an associated image, and wherein each numerical value of the plurality of numerical values is indicative of a label.

19. A non-transitory computer-readable storage medium having stored thereon instructions that, when executed by at least one processor, cause the at least one processor to:
   obtain a plurality of images of an object;
   obtain a plurality of segmentation masks associated with the plurality of images, each segmentation mask of the plurality of segmentation masks including at least one label indicative of at least one segment of the object in a respective image of the plurality of images;
   train, using the plurality of images and the plurality of segmentation masks, a machine-learning model to generate one or more semantically-labeled three-dimensional models of the object; and
   generate using the trained machine-learning model, a semantically-labeled three-dimensional model of the object, the semantically-labeled three-dimensional model of the object including at least one label indicative of the at least one segment of the object.

20. The non-transitory computer-readable storage medium of claim 19, wherein the semantically-labeled three-dimensional model of the object comprises a multi-view consistent feature space.

21. The non-transitory computer-readable storage medium of claim 19, wherein to generate the semantically-labeled three-dimensional model of the object, the instructions, when executed by the at least one processor, cause the at least one processor to:
   provide a plurality of locations as inputs to the trained machine-learning model;
   receive, from the trained machine-learning model, a plurality of occupancy values and labels; and
   generate the semantically-labeled three-dimensional model of the object based on the plurality of occupancy values and labels.

22. The non-transitory computer-readable storage medium of claim 19, wherein the machine-learning model comprises a multi-view reconstruction network including a dimension for labels.

23. The non-transitory computer-readable storage medium of claim 19, wherein the machine-learning model comprises a neural radiance field including a dimension for labels.

24. The non-transitory computer-readable storage medium of claim 19, wherein the machine-learning model is trained using the plurality of images, relative locations from which the plurality of images were captured, and the plurality of segmentation masks.

25. The non-transitory computer-readable storage medium of claim 19, wherein the trained machine-learning model is configured to:
   receive, as an input, a location; and
   output a simulated image of the object as captured from the location and information indicative of labels of segments of the simulated image.

26. The non-transitory computer-readable storage medium of claim 19, wherein to obtain the plurality of segmentation masks, the instructions, when executed by the at least one processor, cause the at least one processor to generate, using a trained semantic-segmentation machine-learning model, the plurality of segmentation masks based on the plurality of images.

27. The non-transitory computer-readable storage medium of claim 19, wherein each segmentation mask of the plurality of segmentation masks comprises a plurality of numerical values, wherein each numerical value of the plurality of numerical values corresponds to a pixel of an associated image, and wherein each numerical value of the plurality of numerical values is indicative of a label.

28. An apparatus for generating one or more three-dimensional models, the apparatus comprising:
   means for obtaining a plurality of images of an object;
   means for obtaining a plurality of segmentation masks associated with the plurality of images, each segmentation mask of the plurality of segmentation masks including at least one label indicative of at least one segment of the object in a respective image of the plurality of images;

means for training, using the plurality of images and the plurality of segmentation masks, a machine-learning model to generate one or more semantically-labeled three-dimensional models of the object; and means for generating using the trained machine-learning model, a semantically-labeled three-dimensional model of the object, the semantically-labeled three-dimensional model of the object including at least one label indicative of the at least one segment of the object.

29. The apparatus of claim 28, wherein the semantically-labeled three-dimensional model of the object comprises a multi-view consistent feature space.

30. The apparatus of claim 28, wherein generating the semantically-labeled three-dimensional model of the object comprises:

providing a plurality of locations as inputs to the trained machine-learning model;

receiving, from the trained machine-learning model, a plurality of occupancy values and labels; and generating the semantically-labeled three-dimensional model of the object based on the plurality of occupancy values and labels.

* * * * *